United States Patent Office 3,642,704
Patented Feb. 15, 1972

3,642,704
POLYMERIC COMPLEXES OF SACCHRIN AND CYCLOHEXANESULFAMIC ACID
Wilhelm E. Walles, Midland, Mich., assignor to The Dow Chemical Company, Midland, Mich.
No Drawing. Continuation-in-part of application Ser. No. 573,488, Aug. 19, 1966, which is a continuation-in-part of application Ser. No. 12,254, Mar. 2, 1960. This application Feb. 4, 1969, Ser. No. 796,602
Int. Cl. C08g 19/00; A23l 1/26
U.S. Cl. 260—77.5 BB                 1 Claim

ABSTRACT OF THE DISCLOSURE

Saccharin or cyclamate or a mixture of them in the acid or salt form, is combined with a polymeric cyclic carbamate such as the copolymer of N-vinyl oxazolidinone and an ethylenically unsaturated comonomer to obtain a stable resonance complex of improved properties as a sweetening agent.

---

This is a continuation-in-part of application Ser. No. 573,488 filed Aug. 19, 1966, now Pat. No. 3,449,339, which was a continuation-in-part of application Ser. No. 12,254 filed Mar. 2, 1960 and now abandoned.

According to the present invention I have invented certain novel complexes possessing remarkable stability. All the present complexes have, in common, the property that each of them comprises, as one member of the complex, a cyclic carbamate compound, and as the other member another organic compound comprising at least a cation, that is to say, an electropositive moiety, and a negative organic radical.

The known noun *complex* is used herein in strict accord with one of its known meanings, to designate, in a generic or specific sense, a composition of matter such as those of the present invention; a substance composed of separate molecules bonded together by forces not so strong as conventional covalent bonds but stronger than hydrogen bonding, and strong enough that not only are the present complexes stable under ordinary conditions of preparation, storage, and employment, but also they confer stability on the behaviour of their members.

The bonding of the present complexes arises when candidate substances to become members of the complex are brought into contact one with another, and occurs without addition to or substraction from any compound of any atom.

The noun *complectant* is used generically to designate a molecular chemical substance which may be caused to unite with a compound comprising a cationic, that is to say, an electropositive moiety and a negative organic group in preparation of the present complexes. The complectant is, in general, the material whose properties have been observed to have the greater effect (of the effects of at least two kinds of components of the resulting complex) upon the solubility, stability, physical state, and many other physical properties of the said complex, and is common to many different kinds of complex. All the present complectants are cyclic carbamate compounds.

The noun *complectate* is used in the present specification and claims to designate an organic chemical substance other than the complectant, a molecule of which comprises at least a cation, that is to say a positive moiety, and a negative group, which unites with the complectant in the preparation of the present complexes; the complectate is the material whose properties have frequently been observed to have the greater effect (of the effects of the two kinds of members of the resulting complex) upon many chemical and particularly biochemical properties of the complex. The properties of complectates are dependably stabilized. Volatility, if any, is suppressed. Toxicity is reduced. Routine chemical reactivity is not affected.

In view of these definitions, the present invention relates to novel complexes of which the complectants are cyclic carbamate compounds of which oxazolidinone and oxazinidinone are representative, and designated by the formula

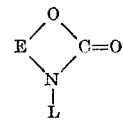

wherein O is the symbol for oxygen, C is the symbol for carbon, N is the symbol for nitrogen, the foregoing being conventional symbols, and wherein E represents a divalent group which, in every occurrence, introduces either two or three carbon atoms at the indicated heterocyclic ring site between nitrogen and oxygen, and may be substituted with hydroxyl, alkyl of up to 30 carbon atoms, hydroxyalkyl, phenyl, phenylalkyl, alkylphenyl, haloalkyl, halophenyl, halophenylalkyl, cycloalkyl of 5 to 6, both inclusive, carbon atoms, alpha-naphthyl, and beta naphthyl. As representative of the moiety E there can be ethylene (dimethylene), trimethylene, methylethylene (isopropylene), 1,2-dimethylethylene (2,3-n-butylene), 1,3-amylene, 2,3-amylene, 2,4-amylene, 1,2-hexylene, 2,4-hexylene, 2,3-hexylene, 3,4-hexylene; cyclohexyl ethylene, phenylethylene, 1-phenyl-1,3-propylene, 1-phenyl-1,2-propylene, (p-tolyl)ethylene, 2-(o-tolyl)-1,3-trimethylene.

In the above type formula, the symbol L is vinyl, allyl, or isopropenyl.

By known addition polymerization of vinyl, allyl, or isopropenyl, L can become a group

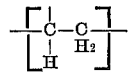

or

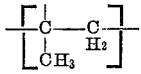

or

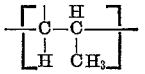

and the resulting compounds are polymers upon each second carbon of which recurs a group

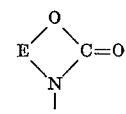

As to forming of the complexes of the present invention, polymers and non-polymers are alike.

The polymers need not be homopolymers; in addition to variety of complex-forming monomers there can be comonomers that do not form complexes but contribute usefully to the physical or other properties of the resulting polymer. Such comonomers include 1,3-butadiene,
2,3-dimethyl-1,3-butadiene,
isoprene,
piperylene,
3-furyl-1,3-butadiene,
3-methyl-1,3-butadiene,
chloro-1,3-butadiene, 2-bromo-1,3-butadiene,
2-chloro-3-methyl-1,3-butadiene,
styrene,
p-chlorostyrene,
p-methoxystyrene,
α-methylstyrene,
vinylnaphthalene,
acrylic acid,
methacrylic acid,
methyl acrylate,
ethyl acrylate,
methyl α-chloroacrylate,
methyl methacrylate,
ethyl methacrylate,
butyl methacrylate,
methyl ethacrylate,
acrylonitrile,
methacrylonitrile,
methacrylamide,
methyl isopropenyl ketone,
methyl vinyl ketone,
methyl vinyl ether,
vinylethinyl alkyl carbinols,
vinyl acetate,
vinyl chloride,
vinylidene chloride,
vinylfurane,
vinylcarbazole,
N-vinyl-3-morpholinone,
vinyl formate,
maleic acid,
itaconic acid,
fumaric acid,
crotonic acid,
allyl alcohol,
vinylfluoride,
2-chloroallyl alcohol,
1-allyloxy-3-chloro-2-propanol,
N-vinylsuccinimide,
N-tertiarybutyl acrylamide,
N-tertiaryoctyl acrylamide,
1,2-dichloropropene-2,
1,2-dichloropropene-1,
trichlorostyrene,
tetrachlorostyrene,
pentachlorostyrene,
o-methylstyrene,
m-methylstyrene,
p-methyl styrene,
p-tertiarybutylstyrene,
p-isopropylstyrene,
p-phenylstyrene,
p-benzoylstyrene,
p-cyanostyrene,
m-nitrostyrene,
m-trifluoromethylstyrene,
m-fluorostyrene,
m-tertiarybutylstyrene,
stearoylstyrene,
oleoylstyrene,
linoleoylstyrene,
α-vinylnaphthalene,
β-vinylnaphthalene,
1-(α-naphthyl)-propene-1,
2-(α-naphthyl)-propene-1,
2-(α-naphthyl)-butene-2,
3-(α-naphthyl)-pentene-2,
2-bromo-4-trifluoromethylstyrene,
β-bromo-α,β-diiodostyrene,
β-bromo-p-methylstyrene,
β-bromo-p-dinitrostyrene,
m-secondarybutylstyrene,
α,β-dibromostyrene,
β,β-dibromostyrene,
α-chloro-2,4,6-trimethylstyrene, α-chloro-2,3,4,6-tetramethylstyrene,
β-chloro-o-nitrostyrene,
1-chloro-2-(p-tolyl)-1-butene,
4(1-chlorovinyl)-anisole,
2-(1-chlorovinyl)-4-methylanisole,
1-chloro-4-vinylnaphthylene,
4(1-chlorovinyl)-2-isopropyl-5-methylanisole,
4(2-chlorovinyl)-2-isopropyl-5-methylanisole,
p-cyclohexyl styrene,
2-ethyl-1-phenyl-1-butene,
3,5-diethyl styrene,
4-fluoro-3-trifluoromethyl-α-methylstyrene,
α,α-trifluoro-m-propenyl-toluene,
2-isopropyl-5-methyl-4-vinyl anisole,
2-methyl-3-phenyl-2-pentene,
methyl styryl ether,
N,N-dimethyl-m-vinylaniline,
2-(α-naphthyl)-2-butene,
1,1-diphenyl-ethylene,
propenyl benzene,
stilbene,
1-vinylacenaphthene,
p-vinylbenzonitrile,
p-vinylbiphenyl,
2-vinylfluorene,
6-vinyl-1,2,3,4-tetrahydro-naphthalene,
p-vinylphenetole,
vinylbutyrate,
vinylbenzoate,
vinylquinoline,
2-vinylpyridine,
2-methyl-5-vinylpyridine,
4-vinylpyridine,
N,N-diallylacrylamide,
diallylamine,
diallylmethacrylamide,
2,5-dimethyl-3,4-dihydroxy-1,5-hexadiene,
2,5-dimethyl-2,4-hexadiene,
divinylbenzene,
divinyl ester of diethylene glycol,
trivinyl benzene,
2,7-dimethyl-1,7-octadiene,
1,7-octadiene,
p-diisopropenylbenzene,
1,3,5-triisopropenylbenzene,
p,p',diisopropenyldiphenyl,
1,1,3,3-tetrallyl-1,3-propanediol,
1,1,3,3,-tetramethallyl-1,3-propanediol,
4,6-dimethyl-4,6-dihydroxy-1,8-nonadiene,
2,4,6,8-tetramethyl-4,6-dihydroxy-1,8-nonadiene,
nonadiene-1,8,
2,8-dimethylnonadiene-1,8,
acetyl triallyl citrate,
ethylene,
propylene, and
maleic anhydride.

The polymers are typically of K-values according to Fikentscher of from about 2 to about 200.

The complectates are organic compounds containing hydrogen attached to a negative, that is to say, an anionic organic group. The negative or anionic organic groups are those generally recognized by chemists, for example as defined in Hackh's Chemical Dictionary by Grant, (Mc-Graw-Hill Book Company, New York, 3rd edition, 1944) page 565, see "negative group," second meaning. Within the scope of the definition, the negative groups to be employed are those which exclude inorganic groups.

More particularly, a complectate to be employed in the present invention is a compound of the formula

$$Q_n\text{---}G\text{---}R$$

In this general formula, Q represents hydrogen or, by dissociation as in water, an electron remaining with the dissociated ion, as when the proton of hydrogen exists temporarily in isolation.

Further, in this formula, $n$ represents the valency of G with respect to Q.

In certain of the present complectates, the compound is best understood when G and R are taken together. In such compounds, these two moieties taken together can represent

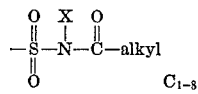

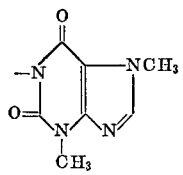

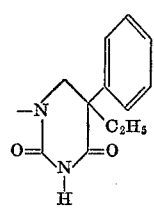

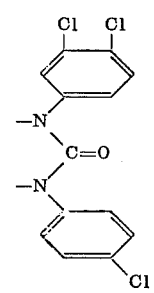

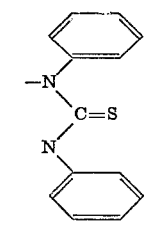

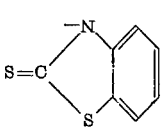

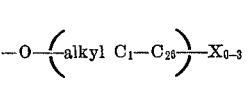

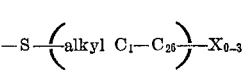

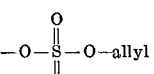

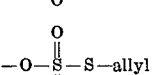

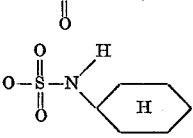

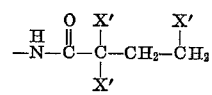

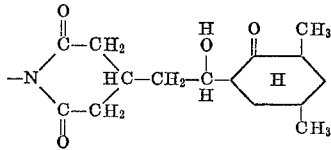

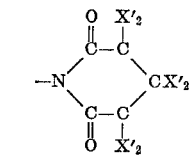

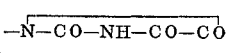

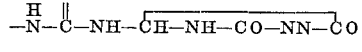

—N(CONH$_2$)$_2$

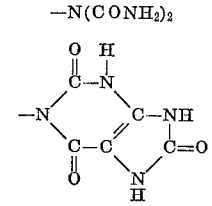

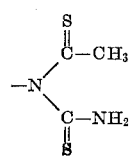

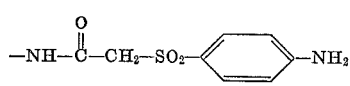

No byproduct is formed as a result of preparation of the instant complexes. By the employment of stoichiometric amounts of pure starting materials it is possible to prepare the present complexes in pure form. If the complectant be employed in excess, a resulting pure but unsatisfied complex will be prepared. If complectate be employed in excess, a resulting complex impure by reason of surplus complectate will be prepared. In the latter instance, employment of further complectant wherewith to prepare further complex binds the excess complectate, obviating need for other means of purification.

The utilities of the present complexes are, in general, control of solubility and dispersibility of bound substances in a variety of solvents and non-solvent media, making possible exhibition of desirable properties deriving from the complectate but not otherwise available; in a wide range of applications the complexes exhibit useful biological properties deriving from the complectates but greatly attenuated undesired toxic properties of the complectates. Many of the complexes exhibit the useful properties but almost none of the vapor pressure of vapor-producing complectates. The complexes have wide application in chemical purification, extraction, and synthesis. Complexes of good stability are prepared comprising complectates which are chemically unstable; but such complexes usually exhibit desired properties such as biological activities of the complectate. Other useful properties are apparent in the following portions of the present specification.

The complectant materials to be employed according to the present invention, including many of the non-polymeric materials, are readily prepared according to the following general reaction.

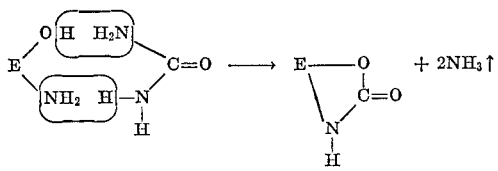

wherein E has the values hereinbefore set forth. By the choice of appropriate starting materials, a choice which, in view of the present teaching, lies readily within the skill of chemists, it is possible to prepare oxazolidinones and substituted oxazolidinones of an extremely wide range.

When it is desired to prepare a cyclic carbamate material the structure of which can be accurately predicted from the identity of the starting materials, the aminoalkanol material to be reacted with urea should, preferably, contain only one hydroxyl group; when only one such hydroxyl group is present the reaction follows the course indicated in the foregoing general reaction. When however, there is employed an amino alkanol material containing more than one hydroxyl group, ring closure and resulting formation of a cycliccarbamate may occur between the urea moiety and the amino alkanol moiety involving one, or, as the case may be, the other hydroxyl site. Thus, various reaction products of uncertain identity may be prepared. However, the reactions of two aminodiols have been studied, and they may be employed with confidence. When, the starting aminoalkanol compound is 4-amino-1,3-butanediol, the resulting compound is 5-hydroxyethyl-oxazolidin-2-one. When the starting compound is 2-amino-1,4-butanediol, the resulting compound is 4-hydroxyethyloxazolidin-2-one. Either of the said hydroxyethyl oxazolidinones may be dehydrated, as by heating gently in the presence of phosphorous pentoxide ($P_2O_5$) at temperatures in the general range of 50° to 100° and preferably 60° to 70° C. in an inert solvent such as dioxane, pyridine, or the like whereby the hydroxyethyl group, being dehydrated, yields a vinyl group as substituent on the said position of the oxazolidinone ring. In an alternative procedure, the oxazolidinone not bearing a substituent upon the ring nitrogen atom may be reacted with an alkenyl alkyl either in dimethyl formamide solvent and in the presence of mercuric acetate catalyst in a known trans-alkenylation reaction whereby to introduce, as substituent upon the ring nitrogen of oxazolidinone, or oxazinadinone, and alkenyl substituent.

Complectant materials may, if desired, be polymerized. Such polymerization is readily effected in known procedures, for example by heating the desired monomer or mixture of monomers in a reaction medium such as water, in the presence of a small amount, for example 0.5 weight percent, of a polymerization catalyst such as benzoyl peroxide or $\alpha,\alpha'$-azobis(isobutyronitrile), at a temperature in the range of from 50° to 100° C. When it is desired to obtain the high molecular weight polymers, the polymerization is carried out at a temperature in the lower portion of the polymerization temperature range and with a relatively smaller amount, for example, 0.01 to 0.1 weight percent of catalyst. When it is desired to obtain the various low molecular weight polymers of the present invention, representing a very small number of monomeric moieties, the polymerization is carried out at a temperature in the upper portion of the polymerization temperature range, such as 80°–90° C., and in the presence of a relatively larger amount, for example 2 to 3 weight percent of catalyst. Upon completion of the polymerization, the components of the resulting mixture may if desired be separated according to molecular weight in known manners, such as fractional distillation, centrifugation, and the like.

The polymerization of the alkenyl substituted cyclic carbamates alone or with ethylenically unsaturated copolymerizable substances to prepare polymeric including copolymeric complectants to be used in the present invention proceeds in manners generally similar to the polymerization of other alkenyl monomers.

The present polymers and copolymers, in general, show little or no tendency to be injured by exposure to, for example, sunlight, air, and heat and other influences within in a moderate temperature range near to living conditions of animal and vegetable organisms.

The present complectants and, correspondingly, the present complexes may readily be formed into desired shapes and sizes. Such forming is, in general, readily effected by the simple means of subjecting the complectants or complex in granular or pulverulent form to a formative pressure in such known procedures as tableting and the like.

Complexes of the present invention whereof the complectate was saccharin were prepared and studied in detail. Not only do such complexes represent a valuable and obviously useful embodiment of the present invention, but they establish that the necessary complectate structure is not disturbed by being bonded as a heterocyclic moiety. Thus the present complexes strongly confirm that the electronic structure of certain moieties or portions of the complectate molecule is critical but that the further structure of the complectate is virtually without effect upon the operability of a complectate.

EXAMPLE 1

Complex of saccharin and N-ethyl-5-methyl-2-oxazolidinone

To a total of 29 grams of N-ethyl-5-methyl-2-oxazolidinone (a liquid at room temperature) was added 1 gram dry granular 2,3-dihydro-3-oxobenzisosulfonazole compound, commonly known as saccharin. The dispersion was heated gently to a temperature of 60° C. During the heating, the saccharin disappeared as the complex formed. The resulting preparation was then cooled to room temperature, approximately 20° C., and at such temperature remained pellucid. Thereafter, the preparation was chilled to 1° C. to ascertain whether, at such temperature the saccharin would precipitate as a crystalline material. No precipitate formed, but the preparation remained completely clear. The infrared spectrum of the resulting preparation confirmed the identity of the complex of saccharin and N-ethyl-5-methyl-2-oxazolidinone.

In a second preparation, the same procedure is carried out except that the complectant is heated to 125° C. prior to addition of sodium saccharin. The complex is formed quickly as a pellucid liquid which remains clear as the complex is cooled to room temperature.

In yet another preparation, formation of the present complex is carried out at 0° C. At such temperature which is approximately 11.5° above the freezing temperature of the complectant, the complecting action takes place slowly, and stirring and agitation are continued during a period of 24 hours. Formation of the desired complex is indicated by the disappearance, in the said mixture, of the granular saccharin material.

EXAMPLE 2

Preparation of a solid complex of saccharin and polymeric 5-methyl-3-vinyl-oxazolidinone One hundred grams of a 10 percent aqueous solution of saccharin was added to 34 grams of a 35 weight percent aqueous solution of polymeric 5-methyl-3-vinyl oxazolidin-2-one having an average molecular weight of approximately 150,000. The resulting mixture was thoroughly stirred at room temperature for a few minutes to obtain a clear aqueous solution of the complex of polymeric 5-methyl-3-vinyl oxazolidin-2-one with saccharin. The solution was drum-dried to obtain a white, solid, non-crystalline complex product. This product was readily soluble in water and was adapted to be used as a non-nutritive sweetening agent.

In one experimental procedure saccharin complex was prepared and air-dried. The complex was a white powder which was found, upon analysis, to comprise 32 weight percent of saccharin complexed with 62 weight percent of the polymeric material and comprising, in the apparently dry form, 6 weight percent of water. In contrast to saccharin alone, the complex was found to be sweet without bitterness or objectionable aftertaste, and adapted to sweeten carbonated soft drinks or fruits. In either cold or hot water or aqueous preparations, the said product was sufficiently soluble to impart any desired sweetness of taste.

EXAMPLE 3

The present example is carried out as was Example 2 except that, in preparing the complex, there is employed 10 milliliters of one weight percent aqueous N-cyclohexyl sulfamate, 10 grams of a 35 weight percent aqueous solution of polymeric 5-methyl-3-vinyl oxazolidin-2-one. The resulting aqueous complex solution is drum dried and reduced to a fine powder to obtain a fine complex of polymeric 5-methyl-3-vinyl-oxazolidin-2-one and N-cyclohexyl sulfamate as a highly water-soluble powder having a distinctive and pleasant sweet taste.

EXAMPLE 4

Complex of saccharin with polymeric 3-vinyl 6-methyl oxazinidin-2-one

The present example is carried out in all respects as was Example 2 except that, as complectant, the present example employs polymeric 3-vinyl-6-methyl oxazinidin-2-one. The resulting product is found to be a white, noncrystalline solid readily soluble in hot aqueous preparations.

EXAMPLE 5

The present example is carried out as was Example 2 except that, in preparing the complex, there is employed 10 milliliters of 1 weight percent aqueous N-cyclohexyl sulfamate, 10 grams of a 35 weight percent aqueous solution of polymeric 5-methyl-3-vinyloxazolidin-2-one and, in an acidification step, 0.6 milliliter normal sulfuric acid. The washed and air-dried product is a white, granular, unsatisfied complex product readily soluble in aqueous preparations, having a noticeably acid flavour, and a sweetness per unit weight of the same general order as sucrose.

EXAMPLE 6

Complex of saccharin with a copolymer of 5-methyl-3-vinyloxazolidin-2-one and styrene The present complectant is a copolymer made from 15 molar proportions of styrene and 85 molar proportions of 5-methyl-3-vinyloxazolidin-2-one. The complectant is a white, finely divided, granular material readily soluble in ethanol. The average molecular weight of the polymer for each cyclic carbamate unit present, is 123.6.

A dry mixture containing 124 grams of the said copolymer of 5-methyl-3-vinyloxazolidin-2-one with styrene and 103 grams (½ mole) saccharin is added with mixing and stirring to 500 milliliters of warm 95 percent ethanol. These solids promptly dissolve and disappear in the ethanol with the resulting formation of the desired complex. Formation of the complex is indicated by, among other things, an ultra-violet fluorescence spectrum different from the combined fluorescence spectra of the starting materials, and the fact that freezing point depression studies indicate dispersion in the ethanol of a number of particles corresponding approximately to the expected number of complectant molecules but not so great as the number of carbamate moieties thereof or correspondingly, the number of complectate molecules.

EXAMPLE 7

Artificially sweetened alcoholic cordial

A flavoring essence derived primary from seeds, stems, and roots of umbelliferous plants, principally anise (*Pimpinella anisum*) and dill (*Anethum graveolens*) together with minor amounts of oil of coriander (*Coriandrum sativum*) and stem and root of angelica (*Angelica archangelica*) is combined with a syrup containing a sweetening syrup of which the sweet flavor is derived from a complex of saccharin and polymeric 3-vinyl-5-methyloxazolidin-2-one, slightly thickened with gum acacia. The resultant intensely sweet highly flavored concentrate syrup is diluted with alcohol and water and thereafter artificially colored by the addition of small amounts of soluble chlorophyll to obtain an artificially sweetened, sugar-free herb-flavored alcoholic cordial. The water and alcohol are added in such amounts as to provide a cordial containing alcohol in the amount of approximately 30 percent by weight of alcohol-water mixture.

EXAMPLE 8

Complex of saccharin and a terpolymer of vinyl acetate N-vinylpyrrolidinone and 5-lauryl-3-vinyloxazolidin-2-one In the present complex, the complectant is a polymer comprising three different monomeric moieties, derived from, respectively, vinyl acetate, N-vinylpyrrolidinone, and 5-lauryl-3-vinyloxazolidin-2-one. The monomeric moieties are present in the ratio, approximately, of 5 molar proportions of the oxazolidinone, 4 molar proportions of the pyrrolidinone, and 1 molar proportion of the vinyl acetate in each ten mlar proportions of monomeric moieties. The said terpolymer has a molecular weight of approximately 100,000, and is relatively dispersible in a wide range of solvents including water, lower alkanols, oils, fats, and such known organic solvents as acetone and other lower alkyl ketones, benzene, toluene, and the like. The terpolymer is a waxy solid at ordinary room temperatures.

To an aqueous solution containing 2.5 grams of sodium saccharin in 100 milliliters water is added 20 grams of the said polymer of vinyl acetate, N-vinyl-pyrrolidinone, and 5-lauryl-3-vinyloxazolidin-2-one. The resulting complection mixture is confined in a closed vessel and mechanically rocked for a period of 24 hours, to help to carry the complection to completion. Thereafter, the resulting mixture is drum-dried to obtain an unsatisfied complex of saccharin and said terpolymer. The complex is a non-crystalline white solid, physically somewhat more firm than the complectant alone, of limited solubility in water.

The complexes comprising 2,3-dihydro-3-oxo-benzisosulfonazole (saccharin) and N-cyclohexyl sulfamic acid or their ionic forms are useful in various applications in which sweetening agents, and in particular non-nutritive sweetening agents are known to be useful. They may be employed as sweetening agents in beverages. The solubility of such complex may be controlled primarily according to the structure and solubility of the complectant. The sweetness of either the complex or the preparation in which it is employed may be controlled by the amount of complex employed and the degree of satisfaction thereof as well as the identity of the complectate. The complexes may be employed as appetitive agents in livestock feeds, therein replacing such known but fermentation-prone sweetening agents as sucrose, molasses, and the like; the complexes may be employed as satients to reduce the feeling of hunger or appetite without contributing nutriment; they may be used as masking agents for unpleasant flavors and in a great many other ways known of sweetening agents generally. The unsatisfied such complexes may be further co-complexed with other complectates having desired properties, to obtain bodying, flavoring, medicating, and like effects.

METHODS OF TESTING FOR COMPLEX FORMATION

It has been pointed out that compounds possessing complectate groups of certain types will bond with the present complectants to form complexes according to the present invention. It may be desirable to demonstrate formation of such complex. Tests which demonstrate formation of the present complexes may be used also to determine whether a candidate complectate outside the present definitions will or will not form a complex, and to distinguish such complex from a simple mutual solution or product of chemical reaction. Skilled chemists will encounter no unusual difficulty in demonstrating existence of complexes of the present invention, or in testing mixtures of complectant and complectate candidate substances in known methods to determine whether complexing has taken place. Test methods which have been found useful include the following:

(1) Infrared spectroscopy. As is well known, the capacity of a substance to transmit the various frequency components of a broad band of infrared radiation varies, selectively, under the influence of certain moieties and groups present in the substance upon a mass of which the radiation impinges. Thus, for example, maxima and minima of transmission at certain frequencies or certain patterns of various frequencies indicate the presence, in the substance through which the spectrum is transmitted, of groups of which such transmission maxima and minima are characteristic. Thus, to a considerable extent, the infrared spectrophotometric curves to be derived from a substance can be predicted from a prior knowledge of its chemical structure. In the instance of a substance of which the spectrum is unknown, or in which the relationship between spectrum and structure is unknown, it is possible to carry out a reference spectrum measurement on a sample whereby to establish a standard applicable to at least material uniform with the sample. It follows, and it is harmonious with observed data, that when a substance is chemically altered, the spectrophotometric curves derived from infrared spectrum analysis are also altered. Commonly, the extent and nature of the chemical change is closely indicated by the change in the infrared spectrum curve. Many of the complexes of the present invention can be shown to be chemically different from either or both starting materials or from a theoretical spectrum representing a mixture thereof by the presence, in such infrared spectrophotometric curves, of departures from the spectra of the starting materials, not ascribable to classical chemical reactions but adequately explained by the concept of shared-electron complexes which may be called molecular resonance complexes. The levels of energy involved in effecting the observed distortions in the infrared spectra coincide closely with the levels of bonding energy ascribed to the instant complexes upon the basis of measurements in other methods. Thus, in the instances of many of the present complexes, infrared spectrum analysis quickly establishes the fact and somewhat regarding the nature of the complex formation.

(2) The bonding together of complectant and complectate according to the present invention effectively reduces the number of particles (considered at the molecular level) in a solution in which such complection takes place. When the camplectant is a polymeric substance to each molecule of which many complectate molecules may be bonded, the formation of a complex according to the present invention may reduce very greatly the number of particles present. Precise determinations of depression of freezing temperature of a solvent by a known amount of a substance to be tested for complection will often indicate a depression of freezing point which conforms to that expected when the smaller number of particles is present when a complex exists; and fails to conform to the expected performance when the larger uncomplected number of the molecules are present in uncombined form. Thus, the application of known cryoscopic methods usefully determines the existence of many of the instant complexes.

(3) Closely related to cryoscopic phenomena is the known effect upon vapor pressure of the number and size of particles of a composition. When precise vapor pressure measurements can readily be made, the contrast between the vapor pressure of a complex and the sum of the vapor pressures of uncomplected substances may often readily be ascertained. This is especially useful when employing a complectate of which the vapor pressure can readily be determined. Complexing according to the present invention has an effect upon the vapor pressure of components of such complex, similar to the effect of chemical condensation; the vapor pressure of the complex is always appreciably lower than the sum of the vapor pressures of the uncomplected components.

(4) Yet another closely related method involves the segregation of components of a dispersion which may be a solution, upon the basis of particle density by means of different rates of sedimentation. Sedimentation may be accelerated, if desired, by such means as the use of an ultracentrifuge. Examination of the fractions separable in such procedures frequently discloses the presence, in the more dense fraction, of particles comprising combined complectant and complectate, which have a specific density higher than the corresponding specific densities of the starting materials.

(5) The spectrum of fluorescent emission excited from the present complexes by incident ultraviolet radiation of wave lentgh near the wavelengths of the visible spectrum is often significantly different from the added fluorescent spectra excited from the uncombined starting materials under similar influence. Thus, ultraviolet spectroscopic studies may readily demonstrate formation of a complex.

(6) Many of the present complexes are clearly describable upon the basis of solubility behavior. Thus, for example, when complectant and complectate are separately dissolved in separate portions of the same solvent each yielding a limpid solution, upon combination of the two solutions a precipitate may form. The change in solubility from starting materials to resulting product is indicated by such precipitation. This indicates, in turn, the formation of a new substance, presently a complex. Solvents useful in this method include water, ethanol, dimethylformamide, and others. In some instance, a complex of the present invention, when washed with another liquid which is solvent for only one complex component, may yield complectant or complectate separately to such solvent.

(7) Among the other numerous methods available to skilled chemists to demonstrate of complexing according to the present invention are biochemical methods. Quantitative determination of biochemical parameters of complectate substances often permits comparison with similar parameters of the substances suspected of comprising a complex. For intance, particularly when employing the polymeric complectants, which are characteristically bland, biologically inert substances, one of the complexes comprising an antimicrobial substances may often be distinguished from a simple mixture of a present complectant and an antimicrobial substance which does not form a complex according to the present invention by the agar cup test hereinbefore described. In general, closely similar results are obtained when using the antimicrobial substance alone or in simple mixture with an another substance which is biologically inert, such as a candidate complectant substance; whereas, when a complex forms, distinctively different antimicrobial action is observed. When complexing takes place and the resulting complex is more soluble than the uncompected complectate, the antimicrobial action will commonly be more widely distributed or diffused over a larger zone; when complexing takes place and the resulting complex has lower solubility or lower vapor pressure or both than the uncomplected complectate, then the antimicrobial action is frequently confined to, but may be more intense in a smaller zone. In addition, many complexes according to the present invention are selective in their action upon microorganisms in ways in which the uncomplected complectates are not. One such phenomenon distinguishes between fungi and bacetria. Complexes of certain antimicrobial substances frequently are germicidial but not fungicidal whereas the uncomplected antimicrobial substances if both germicidal and fungicidal.

It is well known that many liquids when being employed as solvents, form complexes with many solute substances. Thus, for example, many aqueous solutions are, in fact, aqueous dispersions of complexes composed of water and solute. Other solvents of which the same is often true include methylene, dichloride, chloroform, acetic acid, dimethylformamide, and pure, that is to say, 96 percent to 100 percent sulfuric acid. Upon the existence of such complexes have been postulated explanations of such phenomena as azeotropic distillation, cryoscopic phenomena, crystals comprising solvent and crystalloid and the like. The capacity of solvents, and particularly solvents meeting the foregoing criteria for complectates, to form such solvent complexes in some way competes with the capacity of the present complectants to form complexes, with the result that complexes of the present invention may be stable under some conditions such as being dispersed in some solvents while being unstable under other conditions such as being dispersed in other solvents. Thus, for a complex of the present invention to form in solvent when such solvent has a tendency to form a complex with the complectate, the bonding of complectate with the present complectants must be stronger than any tendency of the complectant to form a complex with the solvent. Because both the available solvents and the present complectates are so varied in nature, no general rule for the selection of a suitable solvent can be set forth. It is pointed out, however, that complexes according to the present invention can successfully be prepared in the absence of solvent. Therefore, while it may often be convenient to carry out the preparation of the present complexes in solvent, any problem of solvent sensitvity can be overcome by the simple expedient of preparing the complexes in the absence of solvent, according to methods hereinbefore set forth.

I claim:

1. A complex which is the product of contacting a polymeric cyclic carbamate with a compound selected from saccharin or cyclohexanesulfamic acid or the sodium or calcium salts thereof, or mixtures of the same, said polymeric cyclic carbamate being a copolymer of (1) a monomer of the formula

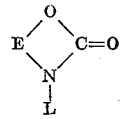

wherein O is the symbol for oxygen, C is the symbol for carbon, N is the symbol for nitrogen and wherein E represents a divalent moiety selected from ethylene, trimethylene, methylethylene, 1,2-dimethylethylene, 1,3-amylene, 2,3-amylene, 2,4-amylene, 1,2-hexylene, 2,3-hexylene, 3,4-hexylene; cyclohexyl ethylene, phenylethylene, 1-phenyl-1,3-propylene, 1-phenyl-1,2-propylene, (p-tolyl)ethylene, 2-(o-tolyl)-1,3-trimethylene; L is vinyl, allyl or isopropenyl and (2) a comonomer selected from the group consisting of 1,3-butadiene,
2,3-dimethyl-1,3-butadiene,
isoprene,
piperylene,
3-furyl-1,3-butadiene,
3-methyl-1,3-butadiene,
chloro-1,3-butadiene,
2-bromo-1,3-butadiene,
2-chloro-3-methyl-1,3-butadiene,
styrene,
p-chlorostyrene,
p-methoxystyrene,
α-methylstyrene,
vinylnaphthalene,
acrylic acid, methacrylic acid,
methyl acrylate, ethyl acrylate,
methyl α-chloroacrylate,
methyl methacrylate,
ethyl methacrylate,
butyl methacrylate,
methyl ethacrylate,
acrylonitrile,
methacrylonitrile,
methacrylamide,
methyl isopropenyl ketone,
methyl vinyl ketone,
methyl vinyl ether,
vinylethinyl alkyl carbinol,
vinyl acetate,
vinyl chloride,
vinylidene chloride,
vinylfurane,
vinylcarbazole,
N-vinyl-3-morpholinone,
vinyl formate,
maleic acid,
itaconic acid,
fumeric acid,
crotonic acid,
allyl alcohol,
vinylfluoride,
2-chloroallyl alcohol,
1-allyloxy-3-chloro-2-propanol
N-vinylsuccinimide,
N-tertiarybutyl acrylamide,
N-tertiaryoctyl acrylamide,
1,2-dichloropropene-2,
1,2-dichloropene-1,
trichlorostyrene,
tetrachlorostyrene,
pentachlorostyrene,
o-methylstyrene,
m-methylstyrene,
p-methylstyrene,
p-tertiarybutylstyrene,
p-isopropylstyrene,
p-phenylstyrene,
p-benzoylstyrene,
p-cyanostyrene,
m-nitrostyrene,
m-trifluoromethylstyrene,
m-fluorostyrene,
m-tertiarybutylstyrene,
stearoylstyrene,
oleoylstyrene,
linoleoylstyrene,
α-vinylnaphthalene,
β-vinylnaphthalene,
1-(α-naphthyl)-propene-1,
2-(α-naphthyl)-propene-1,
2-(α-naphthyl)-butene-2,
3-(α-naphthyl)-pentene-2,
2-bromo-4-trifluoromethylstyrene,
β-bromo-α,β-diiodostyrene,
β-bromo-p-methylstyrene,
β-bromo-p-dinitrostyrene,
m-secondarybutylstyrene,
α,β-dibromostyrene,
β,β-dibromostyrene,
α-chloro-2,4,6-trimethylstyrene,
α-chloro-2,3,4,6-tetramethylstyrene,
β-chloro-o-nitrostyrene, 1-chloro-2-(p-tolyl)-1-butene,
4-(1-chlorovinyl)-anisole,
2-(1-chlorovinyl)-4-methyl-anisole,
1-chloro-4-vinylnaphthylene,
4(1-chlorovinyl)-2-isopropyl-5-methylanisole,
4(2-chlorovinyl)-2-isopropyl-5-methylanisole,
p-cyclohexylstyrene,
2-ethyl-1-phenyl-1-butene,
3,5-diethyl styrene 4-fluoro-3-trifluoromethyl-
  $\alpha$-methylstyrene,
$\alpha,\alpha$-trifluoro-m-propenyl-toluene,
2-isopropyl-5-methyl-4-vinyl anisole,
2-methyl-3-phenyl-2-pentene,
methyl styryl ether,
N,N-dimethyl-m-vinylaniline,
2-($\alpha$-naphthyl)-2-butene,
1,1-diphenylethylene,
propenyl benzene, stilbene,
1-vinylacenaphthene,
p-vinylbenzonitrile,
p-vinylbiphenyl,
2-vinylfluorene,
6-vinyl-1,2,3,4-tetrahydronaphthalene,
p-vinylphenetole,
vinylbutyrate,
vinylbenzoate,
vinylquinoline,
2-vinylpyridine,
2-methyl-5-vinylpyridine,
4-vinylpyridine,
N,N-diallylacrylamide,
diallylamine,
diallylmethacrylamide,
2,5-dimethyl-3,4-dihydroxy-1,5-hexadiene,
2,5-dimethyl-2,4-hexadiene,
divinylbenzene,
divinyl ester of diethylene glycol,
trivinyl benzene,
2,7-dimethyl-1,7-octadiene,
1,7-octadiene,
p-diisopropenylbenzene,
1,3,5-triisopropenylbenzene,
p,p'-diisopropenyldiphenyl,
1,1,3,3-tetraallyl-1,3-propanediol,
1,1,3,3-tetramethylallyl-1,3-propanediol,
4,6-dimethyl-4,6-dihydroxy-1,8-nonadiene,
2,4,6,8-tetramethyl-4,6-dihydroxy-1,8-nonadiene,
nonadiene-1,8
2,8-dimethylnonadiene-1,8,
acetyl triallyl citrate,
ethylene,
propylene, and
maleic anhydride; and the said copolymers have Fikentacher K-value of from about 2 to about 200.

References Cited

UNITED STATES PATENTS

| | | | |
|---|---|---|---|
| 2,845,353 | 7/1958 | Riffkin et al. | 99—141 |
| 3,133,904 | 5/1964 | Tousignant et al. | 260—88.3 |
| 3,449,339 | 6/1969 | Walles | 260—244 |

OTHER REFERENCES

Higuchi et al.: J. Am. Pharm. Soc., Sci. ed. 43, 393–97 (1954).

Drechsel, J. Org. Chem. 22, 849–51 (1957).

Marvel et al.: J. Am. Pharm. Soc., Sci. ed. 49, 417–19 (1960).

Kennon et al.: J. Pharm. Sci. 51, 1149–51 (1962).

MELVIN GOLDSTEIN, Primary Examiner

U.S. Cl. X.R.

99—30, 141 A, 142; 260—301, 307 A